(12) United States Patent  
Tokoyoda

(10) Patent No.: US 7,554,733 B2  
(45) Date of Patent: Jun. 30, 2009

(54) DIFFRACTIVE OPTICAL ELEMENT AND METHOD FOR MANUFACTURING SAME

(75) Inventor: Yoshifumi Tokoyoda, Chiba-ken (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/501,720

(22) Filed: Aug. 10, 2006

(65) Prior Publication Data

US 2006/0268414 A1 Nov. 30, 2006

Related U.S. Application Data

(62) Division of application No. 10/335,166, filed on Jan. 31, 2003, now abandoned.

(30) Foreign Application Priority Data

Feb. 4, 2002 (JP) ............................ 2002-026309  
Feb. 4, 2002 (JP) ............................ 2002-026310  
Mar. 11, 2002 (JP) ............................ 2002-065744

(51) Int. Cl.  
*G02B 5/18* (2006.01)

(52) U.S. Cl. ................ 359/576; 359/569; 359/571; 359/566

(58) Field of Classification Search .............. 359/576, 359/569, 571, 573, 566  
See application file for complete search history.

(56) References Cited

U.S. PATENT DOCUMENTS

| 4,436,398 A | * | 3/1984 | Endo et al. ................. 396/271 |
| 5,734,502 A | | 3/1998 | Ebstein |
| 5,847,877 A | * | 12/1998 | Imamura et al. ............ 359/566 |
| 6,157,488 A | * | 12/2000 | Ishii ............................ 359/569 |
| 6,330,109 B1 | | 12/2001 | Ishii |
| 6,330,110 B2 | * | 12/2001 | Nakai ......................... 359/576 |
| 6,392,805 B1 | | 5/2002 | Ohmori |
| 6,528,005 B2 | * | 3/2003 | Amagai et al. ......... 264/331.12 |
| 6,693,744 B2 | * | 2/2004 | Shimomura ................. 359/565 |
| 7,042,642 B2 | * | 5/2006 | Tokoyoda et al. ........... 359/576 |
| 2001/0015848 A1 | | 8/2001 | Nakai |
| 2001/0036012 A1 | | 11/2001 | Nakai et al. |
| 2001/0038503 A1 | | 11/2001 | Nakai |

FOREIGN PATENT DOCUMENTS

| JP | 11-271513 | 10/1999 |
| JP | 2001-249208 | 9/2001 |

* cited by examiner

*Primary Examiner*—Audrey Y Chang  
(74) *Attorney, Agent, or Firm*—Miles & Stockbridge P.C.

(57) ABSTRACT

A diffractive optical element includes at least a first diffractive element and a second diffractive element. The conditional expression $0.5 \leq D/DS \leq 0.9$ is preferably satisfied where DS denotes the summation of the optimum designed groove height of the first diffractive element d1S and that of the second diffractive element d2S, and D denotes the summation of an actual groove height of the first diffractive element d1 and that of the second diffractive element d2. At least one of the first diffractive element and the second diffractive element is made of glass. At least one of the first diffractive element and the second diffractive element is made of resin. The optimum designed value of groove heights of the diffractive optical element are determined so as to satisfy a condition for correcting chromatic aberration at both d-line and g-line.

11 Claims, 8 Drawing Sheets

# DIFFRACTIVE OPTICAL ELEMENT AND METHOD FOR MANUFACTURING SAME

CROSS-REFERENCE TO RELATED APPLICATION

This application is a divisional of application Ser. No. 10/335,166 filed Jan. 31, 2003 now abandoned.

INCORPORATION BY REFERENCE

The disclosures of the following priority applications are herein incorporated by reference:
Japanese Patent Application No. 2002-026309 filed Feb. 4, 2002,
Japanese Patent Application No. 2002-026310 filed Feb. 4, 2002, and
Japanese Patent Application No. 2002-065744 filed Mar. 11, 2002.

BACKGROUND OF THE INVENTION

1. Field of the Invention

The present invention relates to a diffractive optical element for producing diffracted light flux relative to an incident light, and more particularly to a diffractive optical element constructed by laminating a plurality of diffractive elements.

2. Description of Related Art

A diffractive optical element is an optical element having lattice structure of slits or grooves spacing at even intervals with several hundreds lines per a small distance (about 1 mm), and it has characteristic that when a light is incident to it, it produces diffracted light flux in a direction determined by the wavelength of the light and the separation (pitch) of slits or grooves. Diffractive optical elements like this are used in various kinds of optical systems, for example, an optical element/used as a lens for converging a specific order of diffracted light into a point is known.

In diffractive optical elements like this, a diffractive optical element called a plurality of layers type has been proposed. The diffractive optical element of this type has structure laminating a plurality of diffractive elements having a saw-tooth shape surface in a form appressed or separated with each other. It has a characteristic having high diffractive efficiency over almost entire range of a required wide wavelength range (for example, whole visible light range), in other words, good spectral characteristic.

As shown in FIG. 9, structure of a laminated type diffractive optical element is generally composed of a first diffractive element 310 made of a first material, and a second diffractive element 320 made of a second material having different refractive index and dispersion from those of the first material. The faces of respective diffractive elements facing each other are saw-tooth shape surfaces as shown in the drawing. Here, in order to satisfy the condition for correcting chromatic aberration at predetermined two wavelengths, the groove height d1 of the first diffractive element 310 is set to a predetermined value and that d2 of the second diffractive element 320 is set to another predetermined value. Accordingly, diffraction efficiencies regarding the predetermined two wavelengths become 1.0 and considerably high diffractive efficiency can be obtained at the other wavelength. In the transparent type diffractive optical element, diffractive efficiency is defined as a ratio $\eta_A (=A_1/A_0)$ of amplitude of a first order diffracted light $A_1$ to that of an incident light $A_0$. Alternatively, diffractive efficiency is defined as a ratio $\eta_I (=I_1/I_0)$ of intensity of a first order diffracted light $I_1$ to that of an incident light $I_0$. By the way, the square of light amplitude generally indicates light intensity (for example, $A_1^2=I_1$). In this case, light loss caused by absorption or scattering is supposed not to exist.

However, in a conventional diffractive optical element, in order to satisfy the condition for correcting chromatic aberration at predetermined two wavelengths, the groove height d1 of the first diffractive element 310 and that d2 of the second diffractive element 320 become considerably larger relative to the case each diffractive element is used independently. The groove height of a universally well-known diffractive optical element (a single layer diffractive optical element) is about 1 μm. On the other hand, in almost all these multi-layer type diffractive optical elements, the optimum designed value of the groove height of a diffractive optical element, in other words, the total groove height D (=d1+d2) of all elements becomes more than 10 μm.

In the case of the groove height of whole diffractive optical element becomes large, even if an incident light slightly tilts from the reference optical axis, light flux properly passing through both diffractive optical elements 310 and 320 decreases. Accordingly, it has been a problem that when a rate of decrease in diffractive efficiency relative to variation in the incident angle of the incident light (hereinafter called angular characteristic) is applied, the angular characteristic of the multi-layer type diffractive optical element decreases largely relative to an ordinary diffractive optical element. Moreover, it has become difficult to form grooves of the diffractive element in accordance with the width of the pitch thereof.

Furthermore, in a conventional multi-layer type diffractive optical element shown in FIG. 9, since the groove height d1 of the first diffractive element 310 differs from that d2 of the second diffractive element 320, the diffractive elements 310 and 320 have to be made separately with the same procedure. Finally, both diffractive elements 310 and 320 must be precisely positioned, so that it becomes difficult to manufacture.

SUMMARY OF THE INVENTION

The present invention is made in view of the aforementioned problems and has an object to provide a diffractive optical element capable of enhancing angular characteristic without severely deteriorating spectral characteristic, improving productivity of the diffractive optical element.

It is also an object of the present invention to provide a method for manufacturing a multi-layer type diffractive optical element to be easily manufactured.

According to an aspect of the present invention, a diffractive optical element includes at least a first diffractive element and a second diffractive element. In this diffractive optical element, the following conditional expression is satisfied:

$$0.5 \leq D/DS \leq 0.9$$

where DS denotes a summation of the optimum designed groove heights of the diffractive optical elements and D denotes a summation of actual groove heights of the diffractive optical elements.

In one preferred embodiment of the present invention, at least one of the first diffractive element and the second diffractive element is made of glass.

In other preferred embodiment of the present invention, at least one of the first diffractive element and the second diffractive element is made of resin.

In one preferred embodiment of the present invention, the optimum designed groove heights of the diffractive optical element are determined so as to satisfy a condition for correcting chromatic aberration at both d-line and g-line.

According to another aspect of the present invention, a diffractive optical element includes a first diffractive element and a second diffractive element. The first and second diffractive elements are made of different materials with each other, closely laminated with each other to form grooves of a diffraction grating having a predetermined shape at the cemented surface of both the first and the second diffractive elements. One of these diffractive elements is made of material for molding and the other diffractive element is made of ultraviolet-curable resin. Further, the following conditional expression is satisfied:

$$7.0\ \mu m \leq h \leq 18.0\ \mu m$$

where h denotes the groove height of the diffraction grating.

According to another aspect of the present invention, a diffractive optical element includes a first diffractive element and a second diffractive element. The first and second diffractive elements are made of different materials with each other, closely laminated with each other to form grooves of a diffraction grating having a predetermined shape at the cemented surface of both the first and the second diffractive elements. One of these diffractive elements is made of material for molding and the other diffractive element is made of ultraviolet-curable resin. A pitch of the grooves of the diffraction grating is 70 μm or more.

In one preferred embodiment of the present invention, the material for molding is glass and the following conditional expressions are preferably satisfied:

$$1.55 \leq ndG \leq 1.65$$

$$55 \leq vdG \leq 65$$

$$1.50 \leq ndR \leq 1.60$$

$$vdR \leq 40$$

where ndG denotes refractive index of the glass at d-line, vdG denotes Abbe number of the glass, ndR denotes refractive index of the ultraviolet-curable resin at d-line, and vdR denotes Abbe number of the resin.

In one preferred embodiment of the present invention, the material for molding is glass and the following conditional expressions are preferably satisfied:

$$1.63 \leq ndG \leq 1.73$$

$$50 \leq vdG \leq 60$$

$$1.58 \leq ndR \leq 1.68$$

$$vdR \leq 35$$

where ndG denotes refractive index of the glass at d-line, vdG denotes Abbe number of the glass, ndR denotes refractive index of the ultraviolet-curable resin at d-line, and vdR denotes Abbe number of the resin.

According to another aspect of the present invention, a diffractive optical element includes a first transparent member on which grooves of a diffraction grating is formed, a second transparent member having a plane or curved surface, and an adhesive agent for cementing the grooves of the diffraction grating of the first transparent member with the plane or curved surface of the second transparent member.

In one preferred embodiment of the present invention, the first transparent member is made of material for molding. The adhesive agent is made of ultraviolet-curable resin.

In one preferred embodiment of the present invention, the following conditional expressions are preferably satisfied:

$$1.55 \leq ndG \leq 1.70$$

$$50 \leq vdG \leq 65$$

$$1.50 \leq ndR \leq 1.65$$

$$vdR \leq 45$$

where ndG denotes refractive index at d-line of the first transparent member, vdG denotes Abbe number of the first transparent member, ndR denotes refractive index at d-line of the adhesive agent and vdR denotes Abbe number of the adhesive agent.

In one preferred embodiment of the present invention, the following conditional expression is preferably satisfied:

$$h \leq 16.0\ \mu m$$

where h denotes the groove height of the diffraction grating.

In one preferred embodiment of the present invention, a pitch of the grooves of the diffraction grating is preferably 80 μm or more.

According to another aspect of the present invention, a method for manufacturing a diffractive optical element includes steps of a first step that forms grooves of a diffraction grating on a surface of a first transparent member, a second step that drips an adhesive agent onto the grooves of the diffraction grating on the surface of the first transparent member, a third step that attaches a second transparent member having a plane or curved surface to the adhesive agent, and a fourth step that cures the adhesive agent.

In one preferred embodiment of the present invention, the first step is composed of a hardening step that the first transparent member is pressed, formed and hardened by using a mold on which the grooves of the diffraction grating are formed and a removing step that removes the hardened first transparent member from the mold.

In one preferred embodiment of the present invention, the fourth step is composed of an irradiating step that irradiates the adhesive agent with an ultraviolet light.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIGS. 8A and 8B are sectional views of diffractive optical elements according to modified examples of the third embodiment of the present invention, wherein FIG. 8A is a case that a surface of a second transparent member come in contact with adhesive has a convex shape facing to the diffraction grating side and wherein FIG. 8B is a case that a surface of a second transparent member come in contact with adhesive has a concave shape facing to the diffraction grating side.

DESCRIPTION OF THE PREFERRED EMBODIMENTS

First Embodiment

Figure 1A:
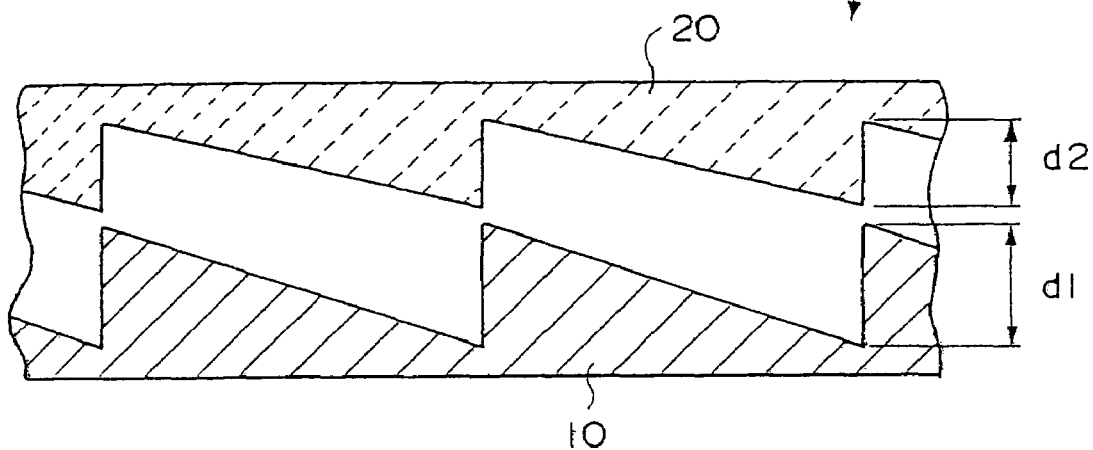
FIG. 1A is a sectional view showing a multi-layer type diffractive optical element composed of separated two layers according to a first embodiment of the present invention and FIG. 1B is a sectional view showing a standard diffractive optical element in accordance with the multi-layer type diffractive optical element.
Figure 1B:
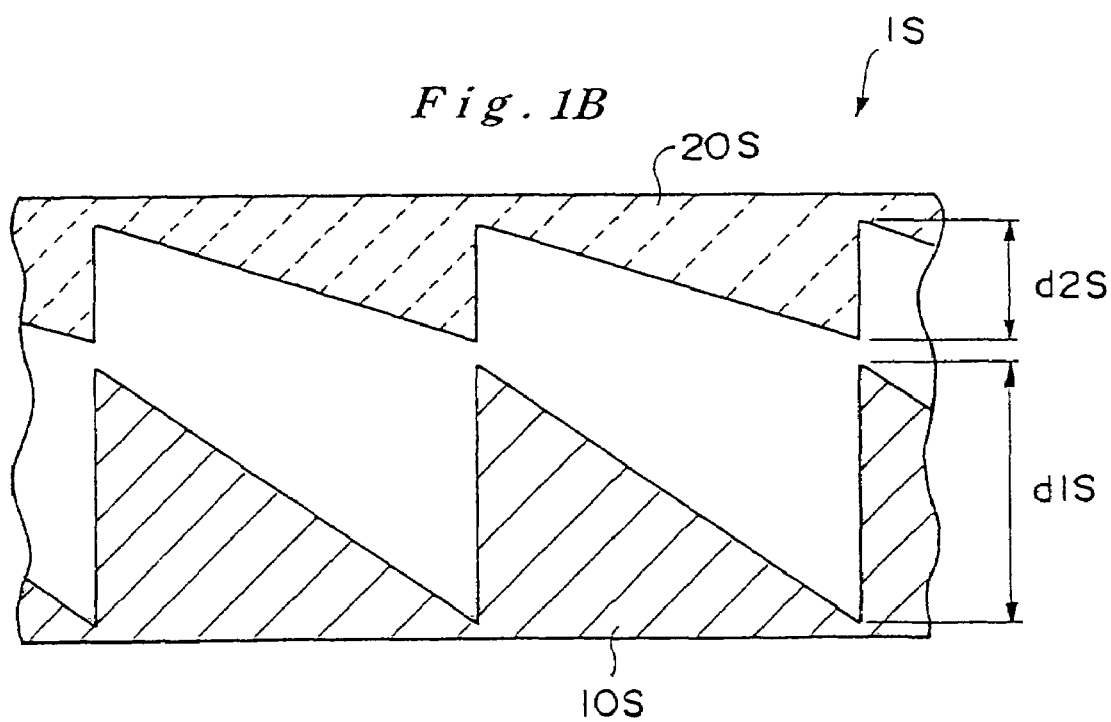

At first, a first embodiment of the present invention is explained with reference to the accompanying drawings. FIG. 1A is a sectional view showing a multi-layer type diffractive optical element composed of separated two layers according to a first embodiment of the present invention. In the diffractive optical element 1 according to the first embodiment of the present invention as shown in FIG. 1A, a first diffractive element 10 arranged to the light-incident side and a second diffractive element 20 arranged to the light-exit side are facing with each other separating with a predetermined distance. The surfaces of both diffractive elements 10 and 20 facing with each other are formed into a sawtooth shape. Moreover, these first and second diffractive elements 10 and 20 are made of different materials with each other and have different refractive indices and dispersion. FIG. 1B is a sectional view showing the diffractive optical element 1S obtained when the diffractive optical element is designed with the optimum conditions by using a first and a second diffractive elements 10S and 20S similar to those 10 and 20 used in the diffractive optical element 1 according to the first embodiment of the present invention. Hereinafter the diffractive optical element 1S is called "the standard diffractive optical element" in opposition to the diffractive optical element 1 according to the first embodiment of the present invention.

As shown in FIGS. 1A and 1B, groove heights of the multi-layer type diffractive optical elements 1 and 1S composed of separated two layers are obtained as described below. In the standard diffractive optical element 1S, the groove height DS is obtained as a summation of the groove height d1S of the first diffractive element 10S and that d2S of the second diffractive element 20S, namely DS=d1S+d2S. In the diffractive optical element 1, the groove height D is obtained as a summation of the groove height d1 of the first diffractive element 10 and that d2 of the second diffractive element 20, namely D=d1+d2.

Here, the groove height d1S of the first diffractive element 10S and that d2S of the second diffractive element 20S is derived by solving the following simultaneous equations (1) and (2):

$$d1S \cdot (n11-1) - d2S \cdot (n21-1) = \lambda 1 \quad (1)$$

$$d1S \cdot (n12-1) - d2S \cdot (n22-1) = \lambda 2 \quad (2)$$

where $\lambda 1$ and $\lambda 2$ denote two wavelengths at which chromatic aberration correction is carried out, n11 denotes the refractive index of the first diffractive element d1S at wavelength $\lambda 1$, n2 denotes the refractive index of the second diffractive element d2S at wavelength $\lambda 1$, n21 denotes the refractive index of the second diffractive element d1S at wavelength $\lambda 1$, and n22 denotes the refractive index of the second diffractive element d1S at wavelength $\lambda 2$.

In the first embodiment of the present invention, relative to the groove height DS (a summation of optimum designed value of the groove height) of the standard diffractive optical element 1S obtained by the summation of d1S and d2S, the groove height D (=d1+d2) of the diffractive optical element 1 of the first embodiment is determined by setting the groove height d1 of the first diffractive element and that d2 of the second diffractive element so as to satisfy the following conditional expression (3):

$$0.5 \leq D/DS \leq 0.9 \quad (3)$$

An example of the specific procedure to determine the groove height D of the diffractive optical element 1 according to the first embodiment of the present invention is explained. After obtaining the groove height d1S of the diffractive element 10S and that d2S of the diffractive element 20S of the standard diffractive optical element 1S by solving simultaneous equations (1) and (2), at first, the groove height d1 of the first diffractive element 10 of the diffractive optical element 1 according to the first embodiment of the present invention is determined by multiplying the groove height d1S of the first diffractive element 10S by the value D/DS (the value can be selected arbitrarily) satisfying the equation (3). Then, the groove height d2 of the second diffractive element 20 of the diffractive optical element 1 according to the first embodiment of the present invention is temporarily set to a value which gives high diffraction efficiency (e.g. 0.98 or more) at using wavelength range (e.g. visible light range).

The groove height d1 of the first diffractive element 10 and that d2 of the second diffractive element 20 of the diffractive optical element 1 according to the first embodiment of the present invention are set in this manner, so the groove height D (=d1+d2) of the diffractive optical element 1 according to the first embodiment of the present invention is derived from both values d1 and d2, and whether the value D satisfies the conditional expression (3) or not is confirmed. When the groove height D does not satisfy conditional expression (3), the procedure for temporarily setting the groove height d2 of the second diffractive element 20 is tried again. When the groove height D satisfies conditional expression (3), the temporarily set value of d2 is set (formally set) as the groove height of the second diffractive element 20.

The diffractive optical element 1 composed of the first diffractive element 10 having the groove height d1 and the second diffractive element 20 having the second groove height d2 obtained (formally set) in accordance with the above-described procedure does not severely deteriorate diffractive efficiency relative to the using wavelength range and improves angular characteristics (see detailed description of preferred embodiments).

In the conditional expression (3), the reason why the lower limit of the groove height of the diffractive optical element 1 according to the first embodiment of the present invention is 0.5 times as high as the groove height DS (optimum designed value of the groove height) of the standard diffractive optical element 1S is that when the ratio D/DS falls below the lower limit of conditional expression (3), degradation of diffractive efficiency in the short wavelength range (around g-line) and in the long wavelength range (around C-line) becomes large (in other words, spectral characteristics becomes worse) and amount of flare light increases. It is difficult to apply such a diffractive optical element to an imaging lens of an imaging device.

In conditional expression (3), the reason why the upper limit of the groove height of the diffractive optical element 1 according to the first embodiment of the present invention is 0.9 times as high as the groove height DS of the standard diffractive optical element 1S is that when the ratio D/DS exceeds the upper limit of conditional expression (3), the groove height becomes almost same as that (namely, the optimum designed value) of the standard diffractive optical element 1S, so that the purpose of the present invention disappears.

When the lower limit of conditional expression (3) is set to 0.55 larger than 0.5, better spectral characteristics can be obtained and when it is set to 0.6 even better spectral characteristics can be obtained. Moreover, when the upper limit of conditional expression (3) is set to 0.85 other than 0.9, better angular characteristics can be obtained and when it is set to 0.8, even better angular characteristics can be obtained.

It is preferable that at least one of the first diffractive element 10 and the second diffractive element 20 of the diffractive optical element 1 according to the first embodiment of the present invention is made of glass. Since glass has a lot of kinds, you can choose from wide option. Moreover, it is preferable that at least one of the aforementioned both diffractive optical elements 10 and 20 is made of resin. Although resin having fewer kinds has narrow choices, resin can be easily processed and has good productivity.

The optimum designed groove height DS of the diffractive optical element 1 according to the first embodiment of the present invention is preferably designed to satisfy the condition of correcting chromatic aberration at d-line and g-line. In this way, the diffractive optical element 1 according to the first embodiment of the present invention can be applied to almost all visible wavelengths, so that it becomes easy to be used for an imaging lens of a photographic camera using a white light. The first embodiment uses diffraction efficiency ($\eta_4$).

EXAMPLE 1

Here, a glass material of BK7 (made by Schott Glas) is used as the first diffractive element 10 and a glass material F2 (made by Schott Glas) is used as the second diffractive element 20. Correction of chromatic aberration is carried out at d-line (587.6 nm) and g-line (435.8 nm). Various values of refractive index are listed in Table 1.

TABLE 1

| | $\lambda 1 = 587.6$ nm | $\lambda 2 = 435.8$ nm |
|---|---|---|
| BK7 | n11 = 1.5168 | n12 = 1.52668 |
| F2 | n21 = 1.62004 | n22 = 1.64202 |

The (optimum designed values) of the groove heights d1S and d2S are calculated by substituting these values for the equations (1) and (2) as shown Table 2.

TABLE 2 d1S (optimum) = 20453 nm
d2S (optimum) = 16100 nm
DS = 36553 nm

EXAMPLE 1-1

In this example, the groove height d1 of the first diffractive element 10 of the diffractive optical element 1 according to the first embodiment of the present invention is set to 18400 nm which is 0.90 times as high as the optimum designed groove height d1S. The groove height d2 is set to 14400 nm which gives high diffraction efficiency over the visible wavelength range. The ratio D/DS is 0.897, so the equation (3) is satisfied.

EXAMPLE 1-2

In this example, the groove height d1 of the first diffractive element 10 of the diffractive optical element 1 according to the first embodiment of the present invention is set to 15400 nm which is 0.75 times as high as the optimum designed groove height d1S. The groove height d2 is set to 11900 nm which gives high diffraction efficiency over the visible wavelength range. The ratio D/DS is 0.747, so the equation (3) is satisfied.

EXAMPLE 1-3

In this example, the groove height d1 of the first diffractive element 10 of the diffractive optical element 1 according to the first embodiment of the present invention is set to 10500 nm which is 0.51 times as high as the optimum designed groove height d1S. The groove height d2 is set to 7850 nm which gives high diffraction efficiency over the visible wavelength range. The ratio D/DS is 0.502, so the equation (3) is satisfied.

The values of diffraction efficiency of the diffractive optical elements according to Example 1 are listed in Table 3 where the pitch of the grooves is 0.1 mm, incident light is d-line, and incident angle is +5°. Moreover, in order to confirm that diffraction efficiency does not sharply decrease at other wavelength, diffraction efficiency at C-line is also shown. The value of diffraction efficiency at C-line is at normal incidence.

TABLE 3

| | diffraction efficiency | |
|---|---|---|
| | d-line (+5°) | C-line (normal) |
| optimum designed value | 0.57 | 0.994 |
| (Example 1-1) | 0.68 | 0.991 |
| (Example 1-2) | 0.80 | 0.989 |
| (Example 1-3) | 0.92 | 0.973 |

EXAMPLE 2

Here, a glass material of FK52 (made by Schott Glas) is used as the first diffractive element 10 and a glass material BaF4 (made by Schott Glas) is used as the second diffractive element 20. Correction of chromatic aberration is carried out at d-line (587.6 nm) and g-line (435.8 nm). Various values of refractive index are listed in Table 4.

TABLE 4

|  | λ1 = 587.6 nm | λ2 = 435.8 nm |
|---|---|---|
| FK52 | n11 = 1.48605 | n12 = 1.49338 |
| BaF4 | n21 = 1.60562 | n22 = 1.62318 |

The (optimum designed values) of the groove height d1S and d2S are calculated by substituting these values for the equations (1) and (2) as shown Table 5.

TABLE 5 d1S (optimum) = 24965 nm
d2S (optimum) = 19066 nm
DS = 44031 nm

EXAMPLE 2-1

In this example, the groove height d1 of the first diffractive element 10 of the diffractive optical element 1 according to the first embodiment of the present invention is set to 20000 nm which is 0.80 times as high as the optimum designed groove height d1S. The groove height d2 is set to 15100 nm which gives high diffraction efficiency over the visible wavelength range. The ratio D/DS is 0.797, so the equation (3) is satisfied.

EXAMPLE 2-2

In this example, the groove height d1 of the first diffractive element 10 of the diffractive optical element 1 according to the first embodiment of the present invention is set to 17500 nm which is 0.70 times as high as the optimum designed groove height d1S. The groove height d2 is set to 13100 nm which gives high diffraction efficiency over the visible wavelength range. The ratio D/DS is 0.695, so the equation (3) is satisfied.

EXAMPLE 2-3

In this example, the groove height d1 of the first diffractive element 10 of the diffractive optical element 1 according to the first embodiment of the present invention is set to 15000 nm which is 0.60 times as high as the optimum designed groove height d1S. The groove height d2 is set to 11100 nm which gives high diffraction efficiency over the visible wavelength range. The ratio D/DS is 0.593, so the equation (3) is satisfied.

The values of diffraction efficiency of the diffractive optical elements according to Example 2 are listed in Table 6 where the pitch of the grooves is 0.1 mm, incident light is d-line, and incident angle is +5°. Moreover, in order to confirm that diffraction efficiency does not sharply decrease at other wavelength, diffraction efficiency at C-line is also shown. The value of diffraction efficiency at C-line is at normal incidence.

TABLE 6

|  | diffraction efficiency | |
|---|---|---|
|  | d-line (+5°) | C-line (normal) |
| optimum designed value | 0.28 | 0.995 |
| (Example 2-1) | 0.62 | 0.989 |
| (Example 2-2) | 0.74 | 0.985 |
| (Example 2-3) | 0.81 | 0.982 |

EXAMPLE 3

Here, a glass material of SK11 (made by Schott Glas) is used as the first diffractive element 10 and a glass material SF4 (made by Schott Glas) is used as the second diffractive element 20. Correction of chromatic aberration is carried out at d-line (587.6 nm) and g-line (435.8 nm). Various values of refractive index are listed in Table 7.

TABLE 7

|  | λ1 = 587.6 nm | λ2 = 435.8 nm |
|---|---|---|
| SK11 | n11 = 1.56384 | n12 = 1.57530 |
| SF4 | n21 = 1.75520 | n22 = 1.79121 |

The (optimum designed values) of the groove height d1S and d2S are calculated by substituting these values for the equations (1) and (2) as shown Table 8.

TABLE 8 d1S (optimum) = 11657 nm
d2S (optimum) = 7925 nm
DS = 19582 nm

EXAMPLE 3-1

In this example, the groove height d1 of the first diffractive element 10 of the diffractive optical element 1 according to the first embodiment of the present invention is set to 10000 nm which is 0.85 times as high as the optimum designed groove height d1S. The groove height d2 is set to 6700 nm which gives high diffraction efficiency over the visible wavelength range. The ratio D/DS is 0.853, so the equation (3) is satisfied.

EXAMPLE 3-2

In this example, the groove height d1 of the first diffractive element 10 of the diffractive optical element 1 according to the first embodiment of the present invention is set to 9000 nm which is 0.75 times as high as the optimum designed groove height d1S. The groove height d2 is set to 5950 nm which gives high diffraction efficiency over the visible wavelength range. The ratio D/DS is 0.763, so the equation (3) is satisfied.

EXAMPLE 3-3

In this example, the groove height d1 of the first diffractive element 10 of the diffractive optical element 1 according to the first embodiment of the present invention is set to 7500 nm which is 0.65 times as high as the optimum designed groove height d1S. The groove height d2 is set to 4850 nm which gives high diffraction efficiency over the visible wavelength range. The ratio D/DS is 0.631, so the equation (3) is satisfied.

The values of diffraction efficiency of the diffractive optical elements according to Example 3 are listed in Table 9 where the pitch of the grooves is 0.1 mm, incident light is d-line, and incident angle is +5°. Moreover, in order to confirm that diffraction efficiency does not sharply decrease at other wavelength, diffraction efficiency at C-line is also shown. The value of diffraction efficiency at C-line is at normal incidence.

TABLE 9

|  | diffraction efficiency | |
| --- | --- | --- |
|  | d-line (+5°) | C-line (normal) |
| optimum designed value | 0.91 | 0.994 |
| (Example 3-1) | 0.94 | 0.989 |
| (Example 3-2) | 0.96 | 0.989 |
| (Example 3-3) | 0.97 | 0.980 |

EXAMPLE 4

Here, a material of PMMA is used as the first diffractive element 10 and a resin material A is used as the second diffractive element 20. Correction of chromatic aberration is carried out at d-line (587.6 nm) and g-line (435.8 nm). Various values of refractive index are listed in Table 10.

TABLE 10

|  | $\lambda 1 = 587.6$ nm | $\lambda 2 = 435.8$ nm |
| --- | --- | --- |
| PMMA | n11 = 1.4908 | n12 = 1.5016 |
| Resin A | n21 = 1.7046 | n22 = 1.7336 |

The (optimum designed values) of the groove height d1S and d2S are calculated by substituting these values for the equations (1) and (2) as shown Table 11.

TABLE 11

| d1S (optimum) = 18520 nm |
| --- |
| d2S (optimum) = 12066 nm |
| DS = 30586 nm |

EXAMPLE 4-1

In this example, the groove height d1 of the first diffractive element 10 of the diffractive optical element 1 according to the first embodiment of the present invention is set to 16000 nm which is 0.86 times as high as the optimum designed groove height d1S. The groove height d2 is set to 10310 nm which gives high diffraction efficiency over the visible wavelength range. The ratio D/DS is 0.860, so the equation (3) is satisfied.

EXAMPLE 4-2

In this example, the groove height d1 of the first diffractive element 10 of the diffractive optical element 1 according to the first embodiment of the present invention is set to 13000 nm which is 0.70 times as high as the optimum designed groove height d1S. The groove height d2 is set to 8240 nm which gives high diffraction efficiency over the visible wavelength range. The ratio D/DS is 0.694, so the equation (3) is satisfied.

EXAMPLE 4-3

In this example, the groove height d1 of the first diffractive element 10 of the diffractive optical element 1 according to the first embodiment of the present invention is set to 9700 nm which is 0.52 times as high as the optimum designed groove height d1S. The groove height d2 is set to 5970 nm which gives high diffraction efficiency over the visible wavelength range. The ratio D/DS is 0.512, so the equation (3) is satisfied.

The values of diffraction efficiency of the diffractive optical elements according to Example 4 are listed in Table 12 where the pitch of the grooves is 0.1 mm, incident light is d-line, and incident angle is +5°. Moreover, in order to confirm that diffraction efficiency does not sharply decrease at other wavelength, diffraction efficiency at C-line is also shown. The value of diffraction efficiency at C-line is at normal incidence.

TABLE 12

|  | diffraction efficiency | |
| --- | --- | --- |
|  | d-line (+5°) | C-line (normal) |
| optimum designed value | 0.74 | 0.995 |
| (Example 4-1) | 0.82 | 0.993 |
| (Example 4-2) | 0.89 | 0.986 |
| (Example 4-3) | 0.95 | 0.971 |

EXAMPLE 5

Here, a resin material of an ultraviolet-curable resin B is used as the first diffractive element 10 and a resin material of an ultraviolet-curable resin C is used as the second diffractive element 20. Correction of chromatic aberration is carried out at d-line (587.6 nm) and g-line (435.8 nm). Various values of refractive index are listed in Table 13.

TABLE 13

|  | $\lambda 1 = 587.6$ nm | $\lambda 2 = 435.8$ nm |
| --- | --- | --- |
| Resin B | n11 = 1.524 | n12 = 1.537 |
| Resin C | n21 = 1.635 | n22 = 1.674 |

The (optimum designed values) of the groove height d1S and d2S are calculated by substituting these values for the equations (1) and (2) as shown Table 14.

TABLE 14

| d1S (optimum) = 9500 nm |
| --- |
| d2S (optimum) = 6900 nm |
| DS = 16400 nm |

EXAMPLE 5-1

In this example, the groove height d1 of the first diffractive element 10 of the diffractive optical element 1 according to the first embodiment of the present invention is set to 7600 nm which is 0.80 times as high as the optimum designed groove height d1S. The groove height d2 is set to 5360 nm which gives high diffraction efficiency over the visible wavelength range. The ratio D/DS is 0.790, so the equation (3) is satisfied.

EXAMPLE 5-2

In this example, the groove height d1 of the first diffractive element 10 of the diffractive optical element 1 according to the first embodiment of the present invention is set to 6700 nm which is 0.70 times as high as the optimum designed groove height d1S. The groove height d2 is set to 4630 nm which gives high diffraction efficiency over the visible wavelength range. The ratio D/DS is 0.691, so the equation (3) is satisfied.

EXAMPLE 5-3

In this example, the groove height d1 of the first diffractive element 10 of the diffractive optical element 1 according to the first embodiment of the present invention is set to 5900 nm which is 0.62 times as high as the optimum designed groove height d1S. The groove height d2 is set to 3980 nm which gives high diffraction efficiency over the visible wavelength range. The ratio D/DS is 0.602, so the equation (3) is satisfied.

The values of diffraction efficiency of the diffractive optical elements according to Example 5 are listed in Table 15 where the pitch of the grooves is 0.1 mm, incident light is d-line, and incident angle is +5°. Moreover, in order to confirm that diffraction efficiency does not sharply decrease at other wavelength, diffraction efficiency at C-line is also shown. The value of diffraction efficiency at C-line is at normal incidence.

TABLE 15

| | diffraction efficiency | |
|---|---|---|
| | d-line (+5°) | C-line (normal) |
| optimum designed value | 0.94 | 0.996 |
| (Example 5-1) | 0.96 | 0.988 |
| (Example 5-2) | 0.97 | 0.982 |
| (Example 5-3) | 0.98 | 0.977 |

As is shown from the above results, when the summation D (=d1+d2) of the groove heights d1 of the first diffractive element 10 and that d2 of the second diffractive element 20 of the diffractive optical element 1 according to the first embodiment of the present invention satisfies the equation (3), the diffractive optical element 1 gives higher diffraction efficiency at incident angle +5° than that of the optimum designed diffractive optical element, so that it has good angular characteristics. Moreover, diffraction efficiency is always 0.97 or more at d-line and g-line, has little spectral dependency, and does not have any sharp drop with respect to wavelength, so that the diffractive optical element 1 also has very good spectral characteristics.

Although the above-mentioned examples relate to the multi-layer type diffractive optical element composed of two layers separated with each other, the present invention can be applied to a multi-layer type diffractive optical element composed of two layers closely laminated with each other or that composed of three or more layers separated or closely laminated with each other.

Figure 2:
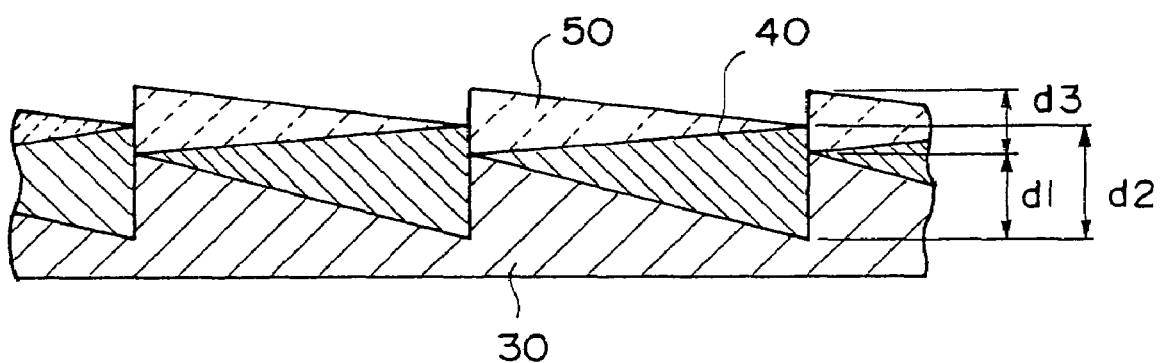
FIG. 2 is a sectional view showing a multi-layer type diffractive optical element composed of closely laminated three layers according to a first embodiment of the present invention.

FIG. 2 is a sectional view showing a multi-layer type diffractive optical element composed of closely laminated three layers according to the first embodiment of the present invention. A first diffractive element 30 whose light-exit-side surface is formed in a saw-tooth shape, a second diffractive element 40 closely laminated with the saw-tooth shape surface of the first diffractive element 30, and a third diffractive element 50 closely laminated with the light-exit-side surface of the second diffractive element 40. These first, second, and third diffractive elements 30, 40, and 50 are made of different materials with each other, so that they have different refractive indices and dispersion with each other.

In a diffractive optical element having such structure, groove heights d1S, d2S, and d3S can be calculated from the following simultaneous equations (4), (5), and (6):

$$d1S \cdot (n11-1) - d2S \cdot (n21-1) + d3S \cdot (n31-1) = \lambda 1 \quad (4)$$

$$d1S \cdot (n12-1) - d2S \cdot (n22-1) + d3S \cdot (n32-1) = \lambda 1 \quad (5)$$

$$d1S \cdot (n13-1) - d2S \cdot (n23-1) + d3S \cdot (n33-1) = \lambda 1 \quad (6)$$

where d1S, d2S, and d3S (d1S, d2S, and d3S are not shown in FIG. 2) denote optimum designed groove heights of the first, second, and third diffractive elements, respectively, $\lambda 1$, $\lambda 2$, and $\lambda 3$ denote wavelengths where chromatic aberration correction is carried out, respectively, n11 denotes refractive index of the first diffractive element 30 at wavelength $\lambda 1$, n12 denotes refractive index of the first diffractive element 30 at wavelength $\lambda 2$, n13 denotes refractive index of the first diffractive element 30 at wavelength $\lambda 3$, n21 denotes refractive index of the second diffractive element 40 at wavelength $\lambda 1$, n22 denotes refractive index of the second diffractive element 40 at wavelength $\lambda 2$, n23 denotes refractive index of the second diffractive element 40 at wavelength $\lambda 3$, n31 denotes refractive index of the third diffractive element 50 at wavelength $\lambda 1$, n32 denotes refractive index of the third diffractive element 50 at wavelength $\lambda 2$, and n33 denotes refractive index of the third diffractive element 50 at wavelength $\lambda 3$.

The optimum designed groove heights d1S, d2S, and d3S of the first, second, and third diffractive elements, respectively, are derived by solving the above simultaneous equations (4), (5), and (6). Then, the groove heights d1, d2, and d3 of the first, second, and third diffractive elements, respectively, composing the diffractive optical element according to the first embodiment of the present invention are determined by using similar procedure described above in the first embodiment.

However, in the multi-layer type diffractive optical element that three layers are closely laminated shown in FIG. 2, the groove height D of the diffractive optical element according to the first embodiment of the present invention is the summation (D=d1+d3) of the groove height d1 of the first diffractive element 30 and that d3 of the third diffractive element 50. The groove height (optimum designed value) DS of the standard diffractive optical element (not shown) is the summation (DS=d1S+d3S) of the groove height (optimum designed value) d1S of the first diffractive element 30 and that (optimum designed value) d3S of the third diffractive element 50.

Figure 3:
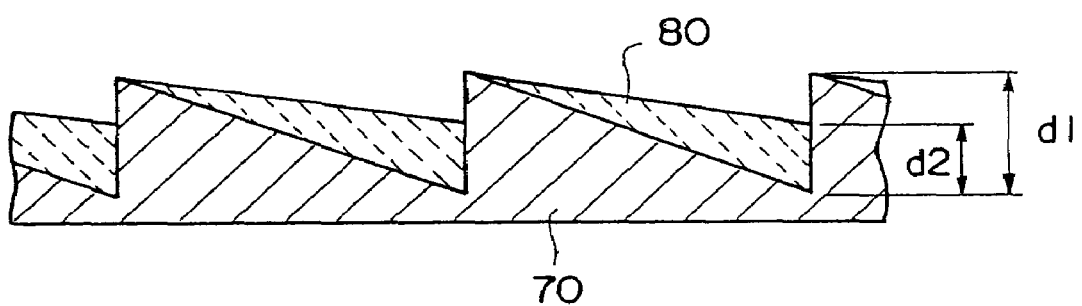
FIG. 3 is a sectional view showing a multi-layer type diffractive optical element composed of closely laminated two layers according to a first embodiment of the present invention.

FIG. 3 is a sectional view showing a multi-layer type diffractive optical element composed of closely laminated two layers according to the first embodiment of the present invention. A first diffractive element 70 whose light-exit-side surface is formed in a saw-tooth shape, and a second diffractive element 80 closely laminated with the saw-tooth shape surface of the first diffractive element 70. These first and second diffractive elements 70 and 80 are made of different materials with each other, so that they have different refractive indices and dispersion with each other. The way to obtain the groove heights d1 and d2 of the first and second diffractive elements, respectively, is the same as the above-described case of the multi-layer type diffractive optical element 1 composed of two layers. The groove height D of the diffractive optical element according to this embodiment, however, is the groove height d1 itself of the first diffractive element 70. Moreover, the groove height (optimum designed value) DS of the standard diffractive optical element (not shown) according to this embodiment is the groove height (optimum designed value) d1S itself of the first diffractive element.

As described above, a diffractive optical element according to the first embodiment of the present invention can improve angular characteristics of diffraction efficiency relative to a conventional one without largely deteriorating spectral characteristics when the groove height is lowered to satisfy the conditional expression $0.5 \leq D/DS \leq 0.9$, where DS denotes the optimum designed value of a groove height of the diffractive optical element and D denotes an actual groove height the diffractive optical element. Moreover, since the groove height D of this diffraction optical element becomes lower than the optimum designed value DS, there is an advantage to be easily manufactured.

Second Embodiment

Figure 4:
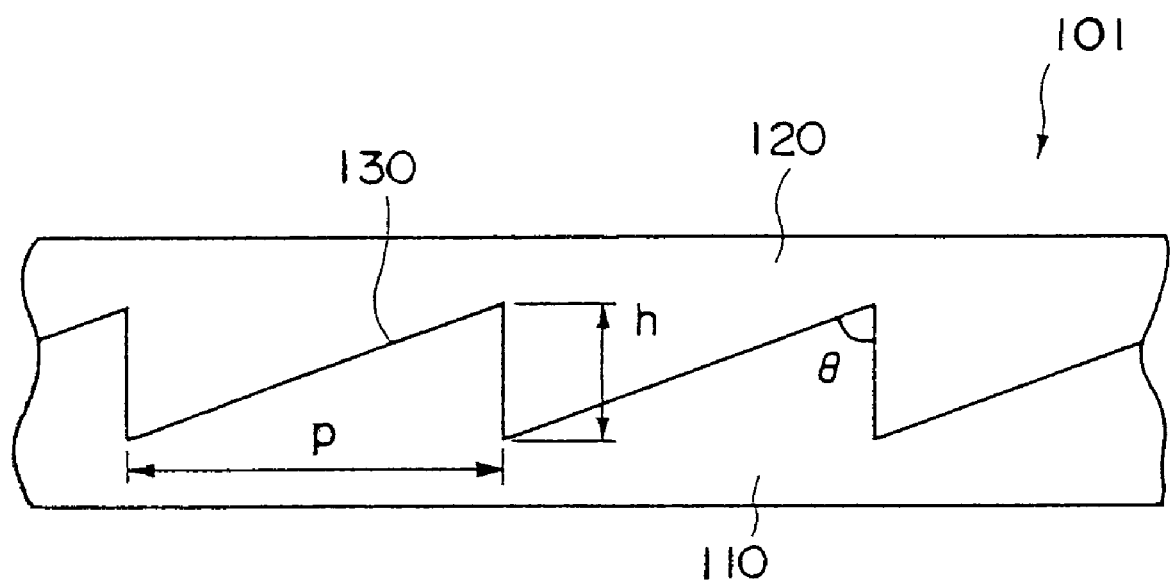
FIG. 4 is a sectional view showing a multi-layer type diffractive optical element composed of closely laminated two layers according to a second embodiment of the present invention.

A second embodiment according to the present invention is explained below with reference to accompanying drawings. FIG. 4 is a sectional view showing a multi-layer type diffractive optical element composed of closely laminated two layers according to a second embodiment of the present invention. The diffractive optical element 101 according to the second embodiment of the present invention is composed of a first diffractive element 110 and a second diffractive element 120, made of different materials with each other, and closely laminated with each other. A diffraction grating 130 is formed on the boundary between the first and second diffractive elements 110 and 120. In the second embodiment of the present invention, although the diffraction grating 130 has a saw-tooth shape, the present invention is not limited to the disclosure.

Figure 9:
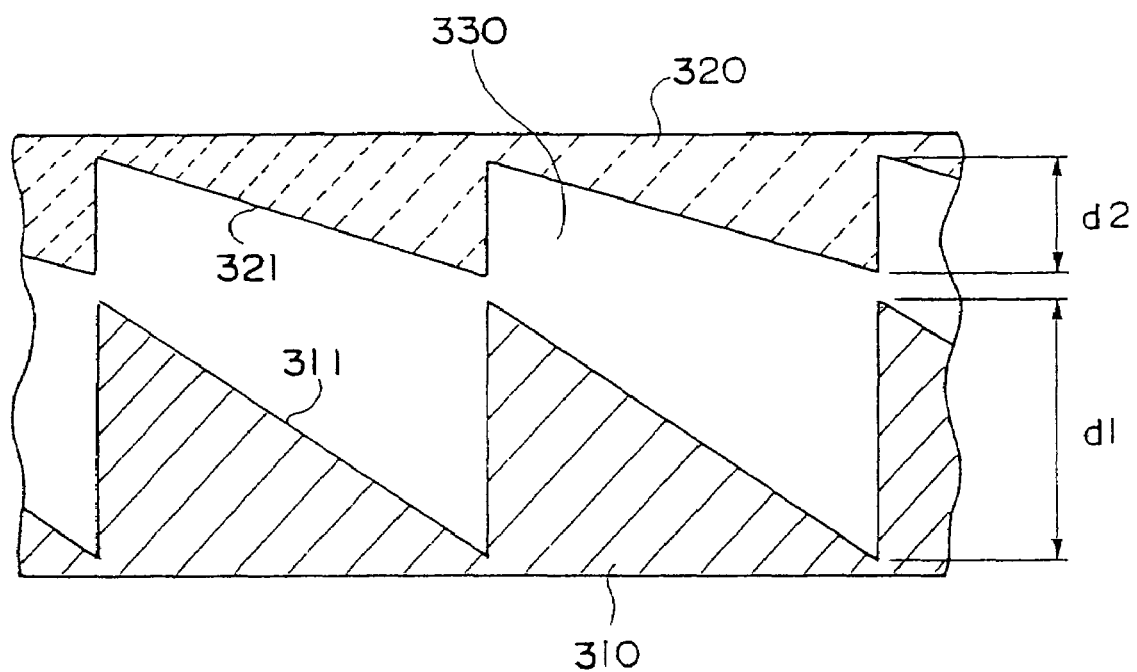
FIG. 9 is a sectional view showing a conventional diffractive optical element.

In the diffractive optical element 101 according to the second embodiment of the present invention, one of materials composing the first and second diffractive elements 110 and 120 is made of glass for glass molding and a material of the other diffractive element is an ultraviolet-curable resin. In the second embodiment of the present invention, although the diffractive optical element is explained to have the structure that the first diffractive element 110 is made of glass for glass molding and the second diffractive element 120 is made of an ultraviolet-curable resin, the order of the materials may be reversed. In the second embodiment of the present invention, it becomes possible to apply injection molding by using the glass for glass molding, so that productivity increases. Moreover, in the second embodiment of the present invention, an ultraviolet-curable resin is used instead of a thermoplastic resin. A thermoplastic resin (MS300, OPET, and the like disclosed in Japanese Laid-Open Patent Application No. 11-271513) has a defect that it has bad contact with glass because of large contraction rate upon molding, so that they are not readily laminated with each other. A molding machine for a thermoplastic resin is a large scale and does not have good productivity. On the other hand, an ultraviolet-curable resin has merit that it has good contact with glass and can be molded with a small molding machine. In the second embodiment of the present invention, since a closely laminated multi-layer type diffractive optical element as shown in FIG. 4 is used, the groove height of the diffraction grating can be lower than a conventional multi-layer type diffractive optical element as shown in FIG. 9. Accordingly, angular characteristics can be improved.

In a diffractive optical element 101 according to the second embodiment of the present invention, the following conditional expression (7) is satisfied:

$$7.0\ \mu m \leq h \leq 18.0\ \mu m \qquad (7)$$

where h denotes the groove height 130 of the diffractive optical element 101. Conditional expression (7) defines an appropriate range of the groove height regarding angular characteristics (the decreasing rate in diffraction efficiency relative to angular change in incident light). When the condition is satisfied, angular characteristics can be improved in comparison with a conventional laminated multi-layer type diffractive optical element. In other words, by lowering the groove height h of the diffraction grating 130 by the upper limit (18.0 μm) of conditional expression (7) or less, light loss upon transmitting can be lower, thereby improving the angular characteristics. However, the height h cannot be lowered without restriction because there is some possibility that severe manufacturing accuracy cannot be satisfied, so that the groove height h of conditional expression (7) preferably has a lower limit. When the lower limit of conditional expression (7) is set to 8.0 μm and the upper limit is set to 16.0 μm, better result can be obtained.

In a diffractive optical element 101 according to the second embodiment of the present invention, the vertex angle θ (see FIG. 4) of the diffraction grating 130 can be gentle by widening the pitch p (minimum pitch: see FIG. 4) of the diffraction grating 130 by 70 μm or more. When the vertex angle θ of the diffraction grating 130 is made to be gentle as described above, by using a mold (a first mold 150) as described below, the shape can precisely be transferred upon forming the first diffractive element 110. Moreover, since an ultraviolet-curable resin dripped onto the diffraction grating 130 transferred as described above spreads all over the grooves of the diffraction grating 130 formed (transferred) on the first diffractive element 110, the diffraction grating 130 having a predetermined shape can be easily formed. Accordingly, the productivity of the diffractive optical element 101 according to the second embodiment of the present invention can be increased. When the pitch (minimum pitch) p of the diffraction grating 130 is made larger to 100 μm or more, the vertex angle θ of the diffraction grating 130 become gentler, so that it becomes easier to form the diffraction grating 130. Moreover, when the pitch becomes wider, angular characteristics increase. According to our simulation, a preferable result can be obtained about 70 μm or more.

Furthermore, in a diffractive optical element 101 according to the second embodiment of the present invention, glass for glass molding composing the first diffractive element 110 preferably satisfies the following conditional expressions (8) and (9) and an ultraviolet-curable resin composing the second diffractive element 120 preferably satisfies the following conditional expressions (10) and (11):

$$1.55 \leq ndG \leq 1.65 \qquad (8)$$

$$55\ vdG \leq 65 \qquad (9)$$

$$1.50 \leq ndR \leq 1.60 \qquad (10)$$

$$vdR \leq 40 \qquad (11)$$

where ndG and vdG denote refractive index at d-line and Abbe number of the glass for glass molding, respectively, and ndR and vdR denote refractive index at d-line and Abbe number of the ultraviolet-curable resin, respectively.

Alternatively, glass for glass molding preferably satisfies the following conditional expressions (12) and (13) and an ultraviolet-curable resin preferably satisfies the following conditional expressions (14) and (15):

$$1.63 \leq ndG \leq 1.73 \quad (12)$$

$$50 \leq vdG \leq 60 \quad (13)$$

$$1.58 \leq ndR \leq 1.68 \quad (14)$$

$$vdR \leq 35 \quad (15).$$

Both conditional expressions (8) and (9), or (12) and (13) define appropriate ranges of glass for glass molding among various kinds of molding glass which is particularly compatible with the ultraviolet-curable resin. When each value becomes out of each range, it becomes difficult to obtain the multi-layer type diffractive optical element according to the second embodiment having a shape that the first diffractive element 110 (glass for glass molding) contacts with the second diffractive element 120 (an ultraviolet-curable resin) at the common diffraction grating 130. When the lower limit and the upper limit of conditional expression (8) are set to 1.57 and 1.63, respectively, and the lower limit and the upper limit of conditional expression (9) are set to 57 and 63, respectively, more preferable result can be obtained. Similarly, when the lower limit and the upper limit of conditional expression (12) are set to 1.65 and 1.70, respectively, and the lower limit and the upper limit of conditional expression (13) are set to 52 and 58, respectively, further more preferable result can be obtained.

Furthermore, conditional expressions (10) and (11), or (14) and (15) define appropriate ranges for keeping various characteristics of the diffractive optical element 101 well. When these values come out from the ranges of the conditional expressions, the groove height h of the diffraction grating 130 becomes high to result in deterioration of angular characteristics or decrease in spectral diffraction efficiency even if the diffractive optical element 101 has a shape that the first diffractive element 110 (glass for glass molding) contacts with the second diffractive element 120 (an ultraviolet-curable resin) at the common diffraction grating 130. When the lower limit and the upper limit of conditional expression (10) are set to 1.52 and 1.58, respectively, and the upper limit of conditional expression (11) is set to 25, better result can be obtained. Similarly, when the upper limit of conditional expression (14) is set to 1.65, and the lower limit and the upper limit of conditional expression (15) are set to 20 and 30, respectively, even better result can be obtained.

Figure 5A:
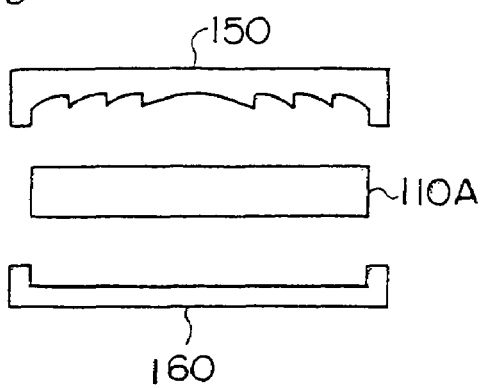
FIGS. 5A-5G are sectional views showing manufacturing processes of the diffractive optical element according to the second embodiment of the present invention.

Then, the manufacturing procedure of the diffractive optical element 101 according to the second embodiment of the present invention is explained. At first, a first mold 150 on which a predetermined shape of a diffraction grating is formed in advance and a second mold 160 on which a predetermined shape of a surface is formed in advance are prepared. Glass 110A for glass molding that is formed to a predetermined shape (e.g., a disk shape in the second embodiment) and heated more than glass transition temperature is prepared (see FIG. 5A). As for glass 110A for glass molding, those explained below in Examples are recommended.

Figure 5D:
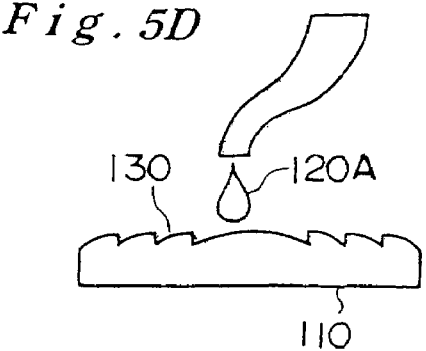
Figure 5B:
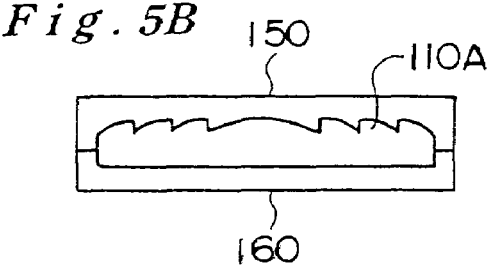
Figure 5E:
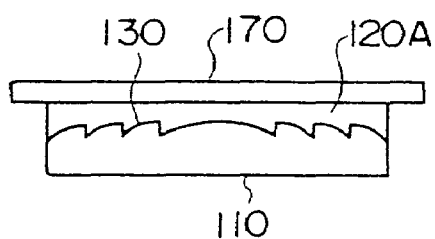
Figure 5C:
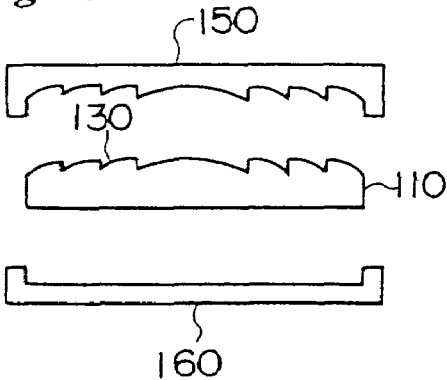

The above-described glass 110A for glass molding that is heated more than glass transition temperature is pressed with the first mold 150 and the second mold 160, gradually cooled to be hardened (see FIG. 5B). The hardened glass 110A for glass molding is removed from the first mold 150 and the second mold 160 (see FIG. 5C). Accordingly, the shape of the diffraction grating formed on the first mold 150 is transferred to the glass 110A for glass molding to form a first diffractive element 110.

Figure 5F:
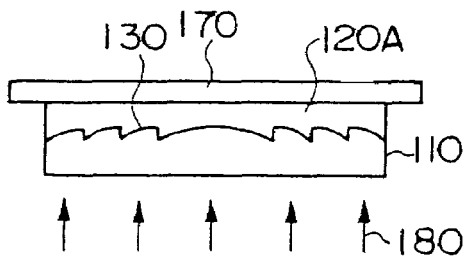
Figure 5G:
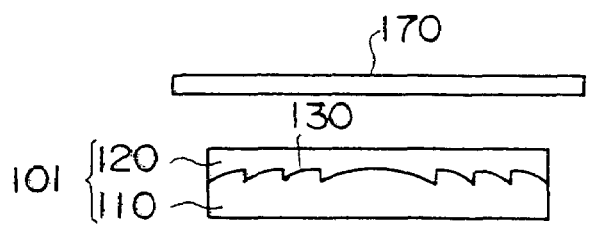

Then, a proper quantity of liquid type ultraviolet-curable resin 120A is dropped onto a surface of the first diffractive element 110 manufactured with the above-described procedure, where the diffraction grating 130 is formed (see FIG. 5D). As for the ultraviolet-curable resin 120A, those explained below in Examples are recommended. In the liquid type ultraviolet-curable resin 120A, a third mold 170 for forming a surface is pressed to the opposite surface of a surface where the diffraction grating 130 is formed (see FIG. 5E). Then, the liquid type ultraviolet-curable resin 120A is cured by radiating it with an ultraviolet light 180 (see FIG. 5F). Accordingly, the second diffractive element 120 that is closely laminated with the first diffractive element 110 is formed. Finally, when the third mold 170 for forming a surface is removed, the laminated multi-layer type diffractive optical element 101 according to the second embodiment of the present invention composed of the first diffractive element 110 (glass for glass molding) and the second diffractive element 120 (ultraviolet-curable resin) is completed.

When the laminated multi-layer type diffractive optical element 101 according to the second embodiment of the present invention is manufactured with the procedure described above, the mold on which the diffraction grating 130 is to be formed in advance is only one (the first mold 150), so that the manufacturing cost can be reduced. Moreover, it is not necessary to adjust both diffraction gratings 130 formed on the first and second diffractive elements 110 and 120. The second embodiment uses diffraction efficiency ($\eta_A$).

EXAMPLE 6

In this example, VC78 having ndG=1.66910, vdG=55.4 (a product of Sumita Optical Glass, Inc.) is used as glass 110A for glass molding and HV16 having ndR=1.5980, vdR=28.0 (a product of ADEL CO., LTD) is used as an ultraviolet-curable resin 120A. The groove height h of the diffraction grating 130 is 8.1 μm. In this construction, we have obtained high diffraction efficiency of 0.97 or more from g-line to C-line.

EXAMPLE 7

In this example, a low-glass-transition-temperature glass A having ndG=1.67790, vdG=55.3 is used as glass 110A for glass molding and an ultraviolet-curable resin D having ndR=1.6350, vdR=23.0 is used as an ultraviolet-curable resin 120A. The groove height h of the diffraction grating 130 is 15.0 μm. In this construction, we have obtained high diffraction efficiency of 0.97 or more from g-line to C-line.

EXAMPLE 8

In this example, VC79 having ndG=1.60970, vdG=57.8 (a product of Sumita Optical Glass, Inc.) is used as glass 110A for glass molding and an ultraviolet-curable resin E having ndR=1.5440, vdR=29.3 is used as an ultraviolet-curable resin 120A. The groove height h of the diffraction grating 130 is 8.8 μm. In this construction, we have obtained high diffraction efficiency of 0.98 or more from g-line to C-line.

EXAMPLE 9

In this example, a low-glass-transition-temperature glass C having ndG=1.59813, vdG=61.1 is used as glass 110A for glass molding and an ultraviolet-curable resin F having ndR=1.5539, vdR=38.1 is used as an ultraviolet-curable resin 120A. The groove height h of the diffraction grating 130 is 16.4 μm. In this construction, we have obtained high diffraction efficiency of 0.98 or more from g-line to C-line.

According to above-described examples of the second embodiment, when the groove height h of the diffraction grating 130 is set to a value satisfying conditional expression (7), we have obtained high diffraction efficiency of 0.97 or more from g-line to C-line and confirmed to have good angular characteristics.

As described above, the second embodiment of the present invention makes it possible to provide a diffractive optical element having improved angular characteristics relative to a conventional one and improved productivity.

Third Embodiment

Figure 6:
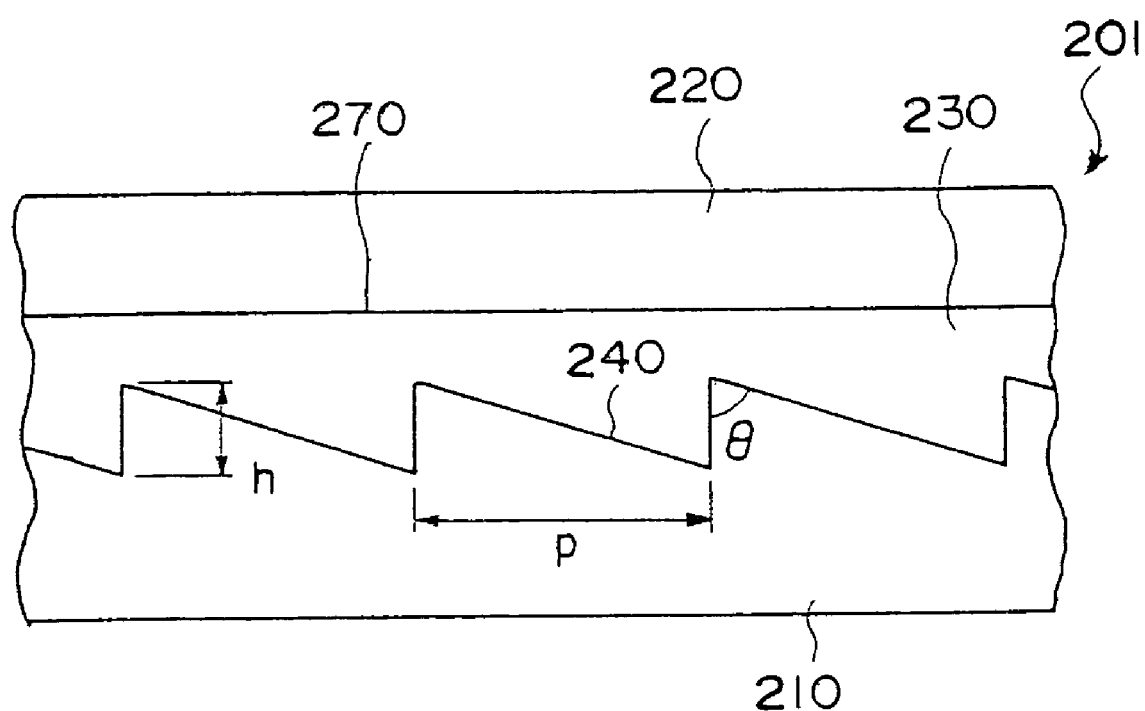
FIG. 6 is a sectional view showing a multi-layer type diffractive optical element composed of closely laminated three layers according to a third embodiment of the present invention.

A third embodiment of the present invention is explained below with reference to accompanying drawings. FIG. 6 is a sectional view showing a multi-layer type diffractive optical element composed of closely laminated three layers according to a third embodiment of the present invention. The diffractive optical element 201 according to the third embodiment of the present invention is composed of a first transparent member 210 on which a diffraction grating 240 is formed, a second transparent member 220 which has a plane or curved surface, and adhesive 230 for cementing the diffraction grating 240 of the first transparent member 210 onto the plane or curved surface of the second transparent member 220. Here, the adhesive and the first transparent member 210 are different in their materials and have different refractive indices or Abbe numbers with each other. The plane or curved surface of the second transparent member 220 does not have grooves of a diffraction grating. In the third embodiment of the present invention, although the diffraction grating 240 formed on the first transparent member 210 has a saw-tooth shape as shown in FIG. 6, the present invention is not limited to the disclosure.

Using this structure of the diffractive optical element 201 makes it possible to manufacture the diffraction grating 240 by using only one mold, so that the conventional procedure that two diffraction gratings are manufactured separately and aligned their relative positions becomes unnecessary. Moreover, since the adhesive 230 is used, a diffractive optical element can be manufactured by putting the adhesive 230 in between the first transparent member 210 and the second transparent member 220 and by curing it. In addition, since the adhesive 230 is used, it is effective to prevent the diffraction grating 240 from coming off at a surface 270.

In the diffractive optical element 201 according to the third embodiment of the present invention, it is preferable that the first transparent member 210 is made of glass for glass molding. The glass for glass molding has a lot of kinds, so that the material has broad options to be easy for manufacturing. Moreover, it is preferable that the adhesive 230 is made of an ultraviolet-curable resin. The ultraviolet-curable resin performs its mission of adhering the first transparent member 210 to the second transparent member 220 and is able to be cured easily by radiating it with an ultraviolet light as described later.

In the diffractive optical element 201, the materials of the first transparent member 210 and the adhesive 230 preferably satisfy the following conditional expressions (16) and (17), and (18) and (19), respectively:

$$1.55 \leq ndG \leq 1.70 \quad (16)$$

$$50 \leq vdG \leq 65 \quad (17)$$

$$1.50 \leq ndR \leq 1.65 \quad (18)$$

$$vdR \leq 45 \quad (19)$$

where ndG and vdG denote the refractive index at d-line and Abbe number of the first transparent member 210, respectively, and ndR and vdR denote the refractive index at d-line and Abbe number of the adhesive 230, respectively.

Conditional expressions (16), (17), (18) and (19) define appropriate ranges of different materials as shown in FIG. 6 (here, they are the first transparent member 210 and the adhesive 230) to be able to contact with each other at the common diffraction grating 240. When each value becomes out of each range, it becomes difficult to obtain the multi-layer type diffractive optical element according to the third embodiment of the present invention. In particular, conditional expressions (16) and (18) are for obtaining good angular characteristics. When each value falls below the lower limit of conditional expression (16) or exceeds the upper limit of conditional expression (18), the groove height h of the diffraction grating 240 (see FIG. 6) becomes too high to obtain a predetermined groove shape with maintaining angular characteristics well. Conditional expressions (17) and (19) are for obtaining good diffraction efficiency over entire wavelength range. When each value becomes out of each range, it becomes difficult to obtain good diffraction efficiency over entire wavelength range.

When the lower limit and the upper limit of conditional expression (16) are set to 1.57 and 1.68, respectively, and the lower limit and the upper limit of conditional expression (17) are set to 52 and 63, respectively, a further preferable result can be obtained. Similarly, when the lower limit and the upper limit of conditional expression (18) are set to 1.52 and 1.63, respectively, and the lower limit and the upper limit of conditional expression (19) are set to 20 and 43, respectively, a further preferable result can be obtained.

Furthermore, in the diffractive optical element 201, the following conditional expression (20) is preferably satisfied:

$$h \leq 16.0 \, \mu m \quad (20)$$

where h denotes the groove height of the diffraction grating 240.

Conditional expression (20) defines an appropriate range of the groove height relative to angular characteristics (the decreasing rate in diffraction efficiency relative to angular change in incident light). When the condition is satisfied, angular characteristics can be improved in comparison with a conventional laminated multi-layer type diffractive optical element. In other words, by lowering the groove height h of the diffraction grating 240 by the upper limit (16.0 μm) of conditional expression (20) or less, light loss upon transmitting can be lower, thereby improving the angular characteristics. However, the height h cannot be lowered without restriction because there is some possibility that severe manufacturing accuracy cannot be satisfied, so that the groove height h of conditional expression (20) preferably has a lower limit. When the lower limit of conditional expression (20) is set to 6.5 μm and the upper limit is set to 15.0 μm, better result can be obtained.

In a diffractive optical element 201 according to the third embodiment of the present invention, the vertex angle θ (see FIG. 6) of the diffraction grating 240 can be gentle by widening the pitch p (minimum pitch: see FIG. 6) of the diffraction grating 240 by 80 μm or more. When the vertex angle θ of the diffraction grating 240 is made to be gentle as described above, by using a mold (a first mold 250) as described below, the shape can precisely be transferred upon forming the first diffractive element 210. Moreover, since an ultraviolet-curable resin dripped onto the diffraction grating 240 transferred as described above spreads all over the grooves of the diffraction grating 240 formed (transferred) on the first diffractive element 210, the diffraction grating 240 having a predetermined shape can be easily formed. Accordingly, the productivity of the diffractive optical element 201 according to the third embodiment of the present invention can be increased. When the pitch (minimum pitch) p of the diffraction grating 240 is made larger to 100 μm or more, the vertex angle θ of the diffraction grating 240 becomes gentler, so that it becomes easier to form the diffraction grating 240.

The diffractive optical element 201 according to the third embodiment of the present invention can be manufactured easily because the first transparent member 210 on which the diffraction grating 240 is formed is simply cemented to the second transparent member 220 having a plane or curved surface between the diffraction grating 240 of the first transparent member 210 and the plane or curved surface of the second transparent member 220 with the adhesive 230.

Figure 7A:
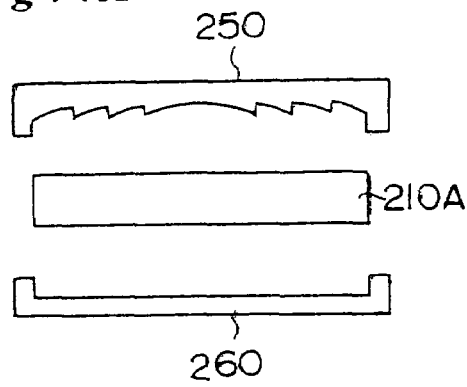
FIGS. 7A-7G are sectional views showing manufacturing processes of the diffractive optical element according to the third embodiment of the present invention.

Then, the manufacturing procedure of the diffractive optical element 201 according to the third embodiment of the present invention is explained. At first, a first mold 250 on which a predetermined shape of a diffraction grating is formed in advance and a second mold 260 on which a predetermined shape of a surface is formed in advance are prepared. Glass 210A for glass molding that is formed to a predetermined shape (e.g., a disk shape in the third embodiment) and heated more than glass transition temperature is prepared (see FIG. 7A). As for glass 210A for glass molding, those explained below in Examples are recommended.

Figure 7B:
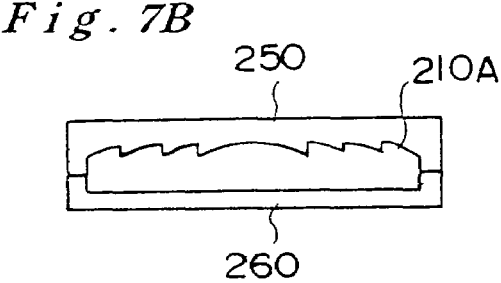
Figure 7C:
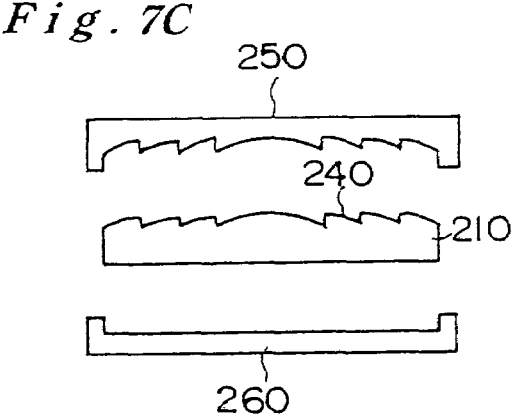

The above-described glass 210A for glass molding that is heated more than glass transition temperature is pressed with the first mold 250 and the second mold 260, gradually cooled to be hardened (a first step, see FIG. 7B). The hardened glass 210A for glass molding is removed from the first mold 250 and the second mold 260 (see FIG. 7C). Accordingly, the shape of the diffraction grating 240 formed on the first mold 250 is transferred to the glass 210A for glass molding to form a first diffractive element 210.

At the same time, the second transparent member 220 is manufactured. The second transparent member 220 has a plane or curved surface 221 where the second transparent member 220 contacts with the adhesive 230 as shown in FIG. 7E. When the material of the second transparent member 220 is glass for glass molding, the glass is heated and pressed by using suitable molds to form the shape. When the material of the second transparent member 220 is common glass, both surfaces are formed by polishing in accordance with the conventional lens manufacturing method. When the material of the second transparent member 220 is resin, both surfaces are formed by molding.

Figure 7D:
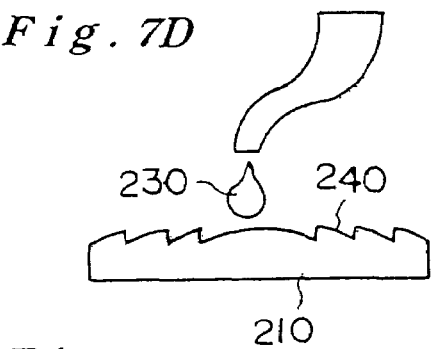
Figure 7E:
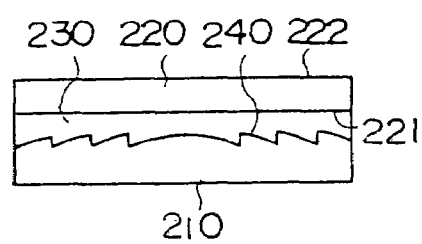
Figure 7F:
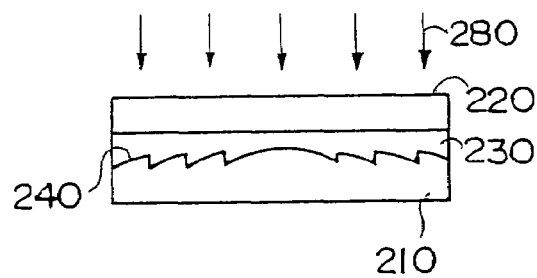
Figure 7G:
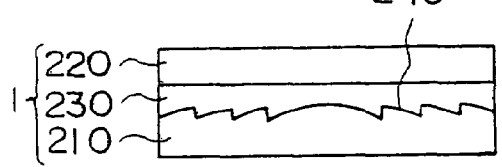

Then, a proper quantity of liquid type adhesive 230 is dropped onto the diffraction grating 240 of the first transparent member 210 manufactured with the above-described procedure (a second step, see FIG. 7D). As for the adhesive 230, an ultraviolet-curable resin is the most suitable, so those explained below in Examples are recommended. In the liquid type adhesive 230, the second transparent member 220 is pressed to the opposite surface 221 of a surface where the diffraction grating 240 is formed (a third step, see FIG. 7E). Then, the liquid type adhesive 230 is cured by radiating it with an ultraviolet light 280 (a fourth step, see FIG. 7F). Accordingly, the first transparent member 210 is cemented with the adhesive 230 and the second transparent member 220 is cemented with the adhesive 230, so that the diffractive optical element 201 according to the third embodiment of the present invention is completed (see FIG. 7G).

In the above-described manufacturing method for the diffractive optical element 201, although the method is for manufacturing the multi-layer type diffractive optical element, among the entire steps, the step for forming grooves of the diffraction grating is only the step for forming the diffraction grating on the first transparent member 210. Accordingly, it simplifies the manufacturing process in comparison with the conventional multi-layer type diffractive optical element shown in FIG. 9 that the diffraction grating 321 must be formed separately on the second optical element 320 other than the diffraction grating 311 is formed on the first optical element 310. Therefore, in the manufacturing method for the diffractive optical element according to the third embodiment of the present invention, the multi-layer type diffractive optical element can be manufactured with low cost, which allows increase in productivity.

Moreover, when the diffractive optical element 201 according to the third embodiment of the present invention is manufactured by the above-described procedure, only one mold (the first mold 250) is required for forming the diffraction grating (here, the grooves of the diffraction grating 240), so that the closely laminated multi-layer type diffractive optical element can be manufactured with low cost. Accordingly, it is not necessary to adjust both diffraction gratings formed on the first transparent member 210 and the adhesive 230. In the third embodiment of the present invention, the first transparent member 210 and the adhesive 230 are only required to have different refractive indices and Abbe numbers with each other, so that it is allowed that the first transparent member 210 and the second transparent member 220 are made of the same material.

Figure 8A:
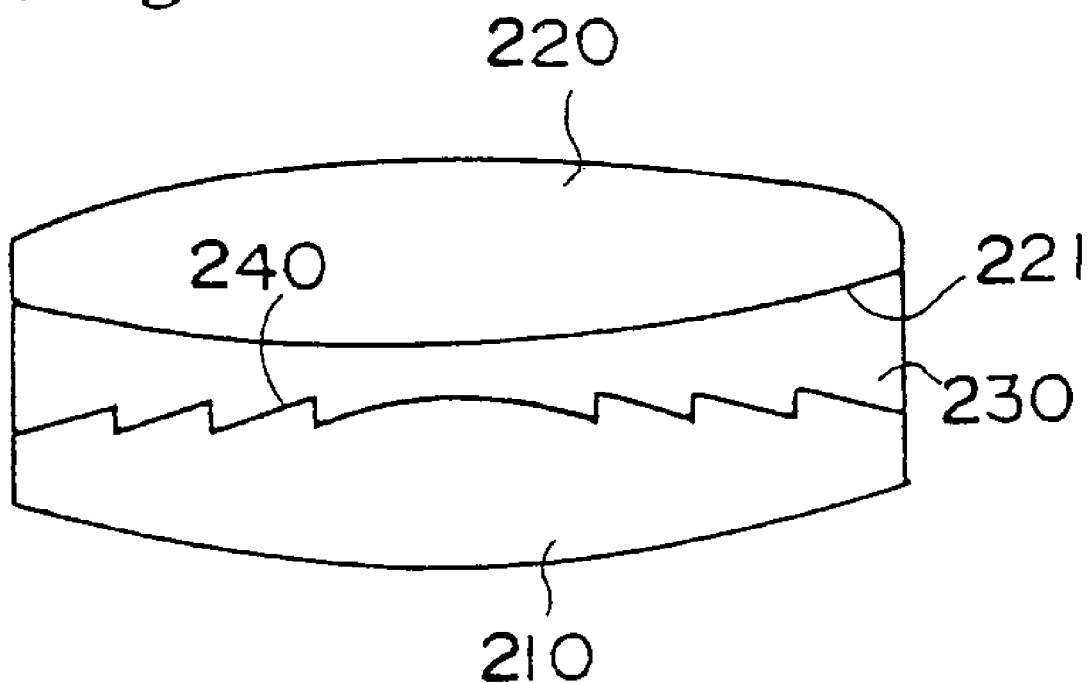
Figure 8B:
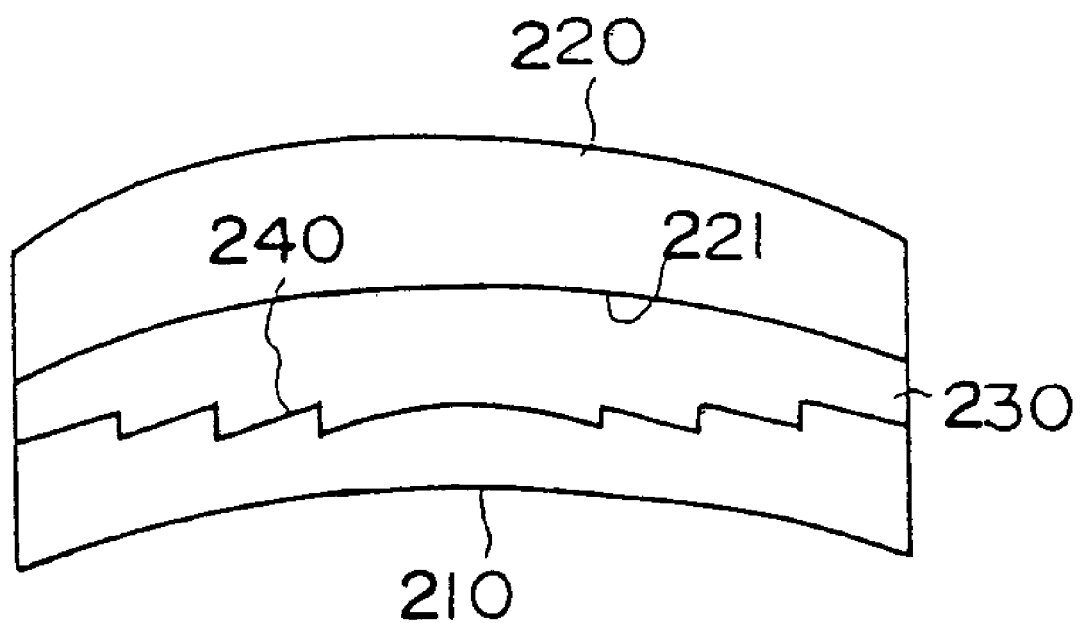

FIGS. 8A and 8B are sectional views of diffractive optical elements according to modified examples of the third embodiment of the present invention. FIG. 8A is a case that a surface 221 of the second transparent member 220 come in contact with the adhesive 230 has a convex shape facing to the diffraction grating 240 side. FIG. 8B is a case that a surface 221 of the second transparent member 220 come in contact with the adhesive 230 has a concave shape facing to the diffraction grating 240 side.

The diffractive optical elements of FIGS. 8A and 8B are bi-convex and concavo-convex lens shapes, respectively. The lens shape of FIG. 8B is constituted by a meniscus that includes the first transparent member 210 and the adhesive agent 230, and by the second transparent member 220, that is curved.

The diffractive optical element 201 according to the third embodiment of the present invention makes it possible to converge a specific order diffracted light at a point to be used as a lens. In this case, the diffractive optical element is made to have a disk shape as a whole. The sectional shape of the diffractive optical element according to the third embodiment of the present invention may be a plane parallel shape as shown in FIG. 6 or lens shapes as shown in FIGS. 8A and 8B. The third embodiment uses diffraction efficiency ($\eta_I$).

EXAMPLE 10

In Example 10, VC78 having ndG=1.66910, vdG=55.4 (a product of Sumita Optical Glass, Inc.) is used as glass 210A for glass molding and HV16 having ndR=1.5980, vdR=28.0 (a product of ADEL CO., LTD) is used as an adhesive 230 (ultraviolet-curable resin). The groove height h of the diffraction grating 240 is 8.0 μm. In this construction, we have obtained high diffraction efficiency of 0.95 or more from g-line to C-line.

EXAMPLE 11

In Example 11, P-SK50 having ndG=1.59380, vdG=61.4 (a product of Sumita Optical Glass, Inc.) is used as glass 210A for glass molding and an ultraviolet-curable resin G having ndR=1.5499, vdR=41.6 is used as an adhesive 230. The groove height h of the diffraction grating 240 is 12.7 μm. In this construction, we have obtained high diffraction efficiency of 0.95 or more from g-line to C-line.

As described above, the third embodiment of the present invention makes it possible to provide a multi-layer type diffractive optical element capable of being manufactured easily and a manufacturing method thereof.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A diffractive optical element having, within its outer bounds, only a single diffraction grating and comprising:
    a first transparent member made of a material on which grooves of the diffraction grating are formed;
    a second transparent member devoid of grooves and having a smooth plane or curved surface; and
    an adhesive agent made of ultraviolet-curable resin, different from the material of the grooves, directly contacting the material of the grooves and cementing the grooves with the plane or curved surface of the second transparent member,
    wherein the material of the grooves and the ultraviolet-curable resin have different refractive indices and different Abbe numbers,
    wherein the grooves form a sawtooth pattern, in which each tooth has a ramp of predetermined length and a height, with the height being less length than the predetermined length of the ramp,
    wherein the following conditional expression is satisfied:

$h \leq 16.0$ μm where h denotes the groove height,
    wherein a pitch of the grooves is 80 μm or more,
    wherein the adhesive agent is cured by the steps of:
    dripping the adhesive agent onto the grooves;
    attaching the smooth plane or curved surface of the second transparent member to the adhesive agent; and irradiating the adhesive agent with ultraviolet light, and
    wherein the following conditional expressions are satisfied:

$1.55 \leq ndG \leq 1.70$ $50 \leq vdG \leq 65$ $1.50 \leq ndR \leq 1.65$ $vdR \leq 45$ where ndG denotes refractive index at d-line of the first transparent member and vdG denotes Abbe number of the first transparent member, ndR denotes refractive index at d-line of the adhesive agent, and vdR denotes Abbe number of the adhesive agent.

2. The diffractive optical element according to claim 1, wherein the transparent members are made of glass.

3. The diffractive optical element according to claim 1, wherein the diffractive optical element has a curved lens shape.

4. The diffractive optical element according to claim 3, wherein the lens shape is constituted by a meniscus that includes the first transparent member and the adhesive agent, and by the second transparent member, that is curved.

5. The diffractive optical element according to claim 3, wherein the lens shape is bi-convex.

6. The diffractive optical element according to claim 3, wherein the lens shape is concavo-convex.

7. A diffractive optical device having, within its outer bounds, only a single diffraction grating and comprising:
    a first transparent member made of a material on which grooves of the diffraction grating are formed;
    a second transparent member devoid of grooves and having a smooth plane or curved surface; and
    an adhesive agent made of ultraviolet-curable resin, different from the material of the grooves, directly contacting the material of the grooves and cementing the grooves with the smooth plane or curved surface of the second transparent member,
    wherein the material of the grooves and the ultraviolet-curable resin have different refractive indices and different Abbe numbers,
    wherein the grooves form a sawtooth pattern, in which each tooth has a ramp of predetermined length and a height, with the height being less length than the predetermined length of the ramp,
    wherein the device satisfies the following conditional expression:

$h \leq 16.0$ μm where h denotes the groove height,
    wherein a pitch of the grooves is 80 μm or more,
    and wherein the diffractive optical device is constructed by steps of:
    forming the first transparent member with grooves by pressing glass for glass molding that is heated to more than glass transition temperature between a first mold having a groove pattern and a second mold, cooling and hardening the glass, and removing the hardened glass from the first mold and the second mold;
    preparing the second transparent member;
    dripping the adhesive agent onto the grooves of the first transparent member;
    attaching the smooth plane or curved surface of the second transparent member to the adhesive agent; and
    irradiating the adhesive agent with ultraviolet light, and
    wherein the following conditional expressions are satisfied:

$1.55 \leq ndG \leq 1.70$ $50 \leq vdG \leq 65$ $1.50 \leq ndR \leq 1.65$ $vdR \leq 45$ where ndG denotes refractive index at d-line of the first transparent member and vdG denotes Abbe number of the first transparent member, ndR denotes refractive index at d-line of the adhesive agent, and vdR denotes Abbe number of the adhesive agent.

8. The diffractive optical element according to claim 7, wherein the diffractive optical element has a curved lens shape.

9. The diffractive optical element according to claim 8, wherein the lens shape is constituted by a meniscus that includes the first transparent member and the adhesive agent, and by the second transparent member that is curved.

10. The diffractive optical element according to claim 8, wherein the lens shape is bi-convex.

11. The diffractive optical element according to claim 8, wherein the lens shape is concavo-convex.

* * * * *